Feb. 17, 1942.  W. IRBY  2,273,576
REFLECTOR
Filed Oct. 22, 1940
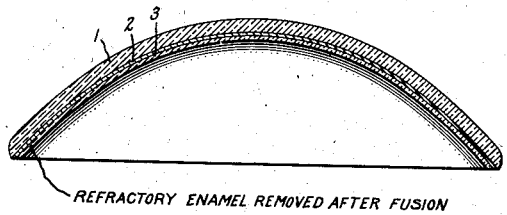
REFRACTORY ENAMEL REMOVED AFTER FUSION
Inventor:
William Irby,
by Harry E. Dunham
His Attorney.

Patented Feb. 17, 1942

2,273,576

UNITED STATES PATENT OFFICE 2,273,576

REFLECTOR

William Irby, Saugus, Mass., assignor to General Electric Company, a corporation of New York Application October 22, 1940, Serial No. 362,221

4 Claims. (Cl. 88—105)

My invention relates to reflectors or mirrors and more particularly to reflectors comprising a metal reflecting surface placed upon a glass form in which the exposed metal surface is used for reflection purposes.

One object of my invention is to provide an improved process for solidifying and permanently attaching the reflecting metal to the glass.

For a better understanding of my invention, together with other and further objects thereof, reference is had to the following description taken in connection with the accompanying drawing, and its scope will be pointed out in the appended claims.

It is often desirable to obtain mirrors or reflectors in which the reflected image is not distorted by the refracting properties of the glass which supports the reflecting film. In the ordinary mirror a silver or other coating is applied to a glass sheet and is thereafter covered with a protective coating and the mirror or reflector is used by permitting the light to travel through the glass to the reflecting surface and thereafter returning through the glass to a desired objective. For some uses such as, for example, in telescopic mirrors the slight diffusion of light, due to the refraction of the glass, is undesirable and it is, therefore, desirable to use the mirror in such manner that the light is reflected directly from the metallic surface without traveling through a sheet of glass. In processes hitherto used difficulty has been encountered in the deposition of the metallic surface upon a supporting glass surface in such manner that a strong metallic surface is obtained which adheres strongly to the glass and can be subjected to frequent cleanings.

In accordance with my improved process I produce a frontal surface mirror by depositing silver upon a glass form in the commonly used manner, either chemically or chemically and electrolytically, and thereafter solidifying that coating and fusing it onto the glass form at high temperatures without an accompanying oxidation of the exposed surface. In accordance with my process I apply to the exposed surface of the metal a protective coating of a refractory enamel which is then fused onto the metal coating by a high temperature fusing process and is thereafter completely removed from the metal surface, preferably by dissolving the enamel with an alkaline solution which will not attack the metal. The metal is thereby left in a solid layer upon the glass, the layer being fused onto the glass so that it is held to the glass by a relatively high degree of cohesion and cannot readily be pried loose from the surface thereof.

In the accompanying drawing the single figure illustrates in cross section a common form of reflector comprising a glass form 1 having a parabolic shape, and upon the concave surface of which a film 2 of silver or other suitable reflecting metal is applied by a well-known and commonly used process. This process includes the step of first thoroughly cleaning the glass form by washing in a solution of caustic soda and thereafter dipping the form into a concentrated commercial solution of nitric acid, the form being rinsed between the two cleaning steps and being thoroughly rinsed with water thereafter. Following these first two steps, the entire surface to be silvered is rubbed with a good grade of whiting while being immersed in a solution of stannous chloride. After rinsing, the form is heated to a temperature of 160° F. to 175° F. and a silvering solution comprising silver nitrate, mixed with a suitable reducer, is applied until a desired thickness of silver is deposited upon the form. This silver film may be increased in thickness by electrolytically adding another film to the chemically deposited film of silver. The thickness of these two films should be in excess of .0003 inch and is preferably of a total thickness of .0006 inch. The film of silver deposited in this manner may be readily peeled from the glass, at this stage of the process, and is easily torn since it comprises minute particles of the metal which have not been alloyed or sintered into a homogeneous mass. This film is, therefore, unsuited for use as a reflector which would necessarily have to be polished often in order to maintain an oxide-free surface.

In accordance with my invention I overcome the above difficulties by heating the glass support and the metallic reflecting layer to a high temperature at which the metallic layer solidifies and becomes fused to the glass supporting surface. In order to protect the exposed surface of the metallic layer against oxidation during this high temperature condition, I provide a protecting layer of a mixture of powdered refractory enamel. This mixture is sprayed on the metal surface before the heating period to form a uniform layer having a thickness of approximately .005 inch. When the reflector is heated to the desired temperature, this enamel mixture becomes fused and protects the metallic surface against oxidation or other deterioration which would otherwise occur due to its affinity for oxygen and other impurities at high temperatures.

This affinity is especially great at the temperatures to which it is necessary to raise the reflector in order to obtain a satisfactory fusion of the metal to the glass supporting surface and a proper solidification of the metallic layer itself.

The enamel used in my process is preferably an enamel having a fusing temperature below the softening temperature of the glass. For ordinary soft glasses this temperature should be between 500° C. and 600° C., or 900° F. and 1100° F. For harder glasses a higher temperature may be used. An example of one suitable mixture of enamel is as follows:

| | Per cent |
|---|---|
| Litharge | 67½ |
| Boric acid | 15 |
| Zinc oxide | 5 |
| Silica | 12½ |

In the preparation of this mixture the powdered ingredients are melted and in this state are poured into cold water. This process produces a friable glass or a product generally known as a frit. This product, or frit, is then ground in a mill until finely powdered and is simultaneously mixed with water to produce a spraying mixture. The mixture is sprayed onto the metal surface until a layer having a thickness of approximately .002 inch to .005 inch is obtained. The reflector or mirror is then placed into an oven of which the temperature is carefully adjusted to approximately 200 F. or slightly less. This temperature is thereafter gradually raised over a period of one hour to 1050° F., that temperature being maintained for one to two hours and then is reduced to room temperature. This process, so far carried out, produces a mirror which comprises a metal layer fused on both sides to glass and which may be exposed to high temperatures without discoloring if the mirror is used in the ordinary manner in which light passes through the glass to the reflecting surface and back again through the glass to the object to be illuminated. In accordance with my improved process, however, the fused enamel coating is removed by immersing the complete reflector in a solution of 15 to 20% caustic soda. This solution attacks the enamel and removes it completely from the deposited metal leaving the exposed surface of the metal clean of oxide and, therefore, in good reflecting condition. It is found that the metal layer is a solid homogeneous layer of metal which adheres to the glass surface, being fused onto the glass and being made an integral part thereof. This metal layer can be subjected to many polishings and will withstand the ordinary wear and tear due to such polishings.

I have described my process as being applied to mirrors. It is obvious, of course, that the process may be applied to the production of other articles in which it is desired to permanently attach a metal surface to glass and in which it is desired to expose the metal surface to the atmosphere.

What I claim as new and desire to secure by Letters Patent of the United States is:

1. A process for producing a reflector including the step of depositing a metal layer upon a supporting glass surface, thereafter applying a refractory mixture of enamel to the exposed surface of said metallic layer, then raising said reflector to the fusing temperature of said enamel mixture to thereby solidify said metallic layer and fuse it to the glass support, the said metallic layer being protected by said fused enamel mixture, and thereafter removing said fused enamel from said metallic surface.

2. A process for producing a reflector including the deposition of a metal layer upon a supporting glass surface, thereafter applying a refractory mixture to the exposed surface of said metallic layer, fusing said metallic layer to said supporting glass by raising said support, said metal, and said mixture to the fusing temperature of said enamel mixture, and thereafter removing the fused refractory mixture from said metallic surface by dissolving it.

3. A process for producing a reflector including the deposition of a metal layer upon a supporting glass surface, thereafter applying a refractory mixture to the exposed surface of said metallic layer, fusing said metallic surface to said glass support by raising said support, said metal, and said mixture to the fusing temperature of said mixture and maintaining it at that temperature until the said refractory mixture is fused, and thereafter removing said fused refractory mixture from said metallic surface by dissolving with an alkaline solution.

4. A process for producing a reflector including the deposition of a metal layer upon a supporting glass surface, thereafter applying a refractory mixture to the exposed surface of said metallic layer, heating said reflector to the fusing temperature of said mixture thereby to solidify said layer and fuse it to the glass support while protecting the outside surface of the metal layer with said mixture, and thereafter removing said fused mixture from said metallic surface by dissolving it with a caustic soda solution.

WILLIAM IRBY.